July 30, 1929.	G. E. HAZARD	1,722,913
TIRE CHANGING MECHANISM
Filed Nov. 3, 1927	3 Sheets-Sheet 1
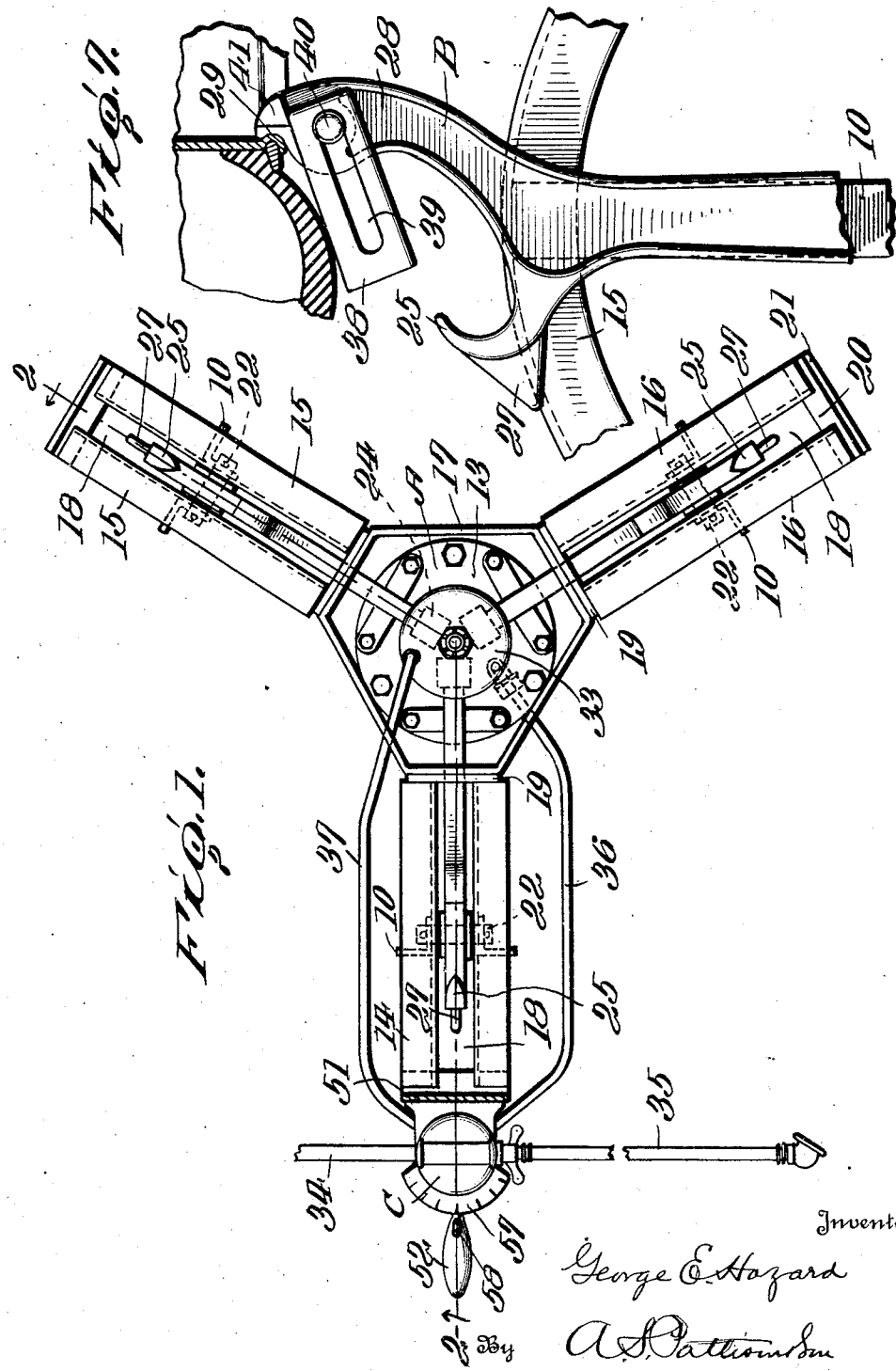

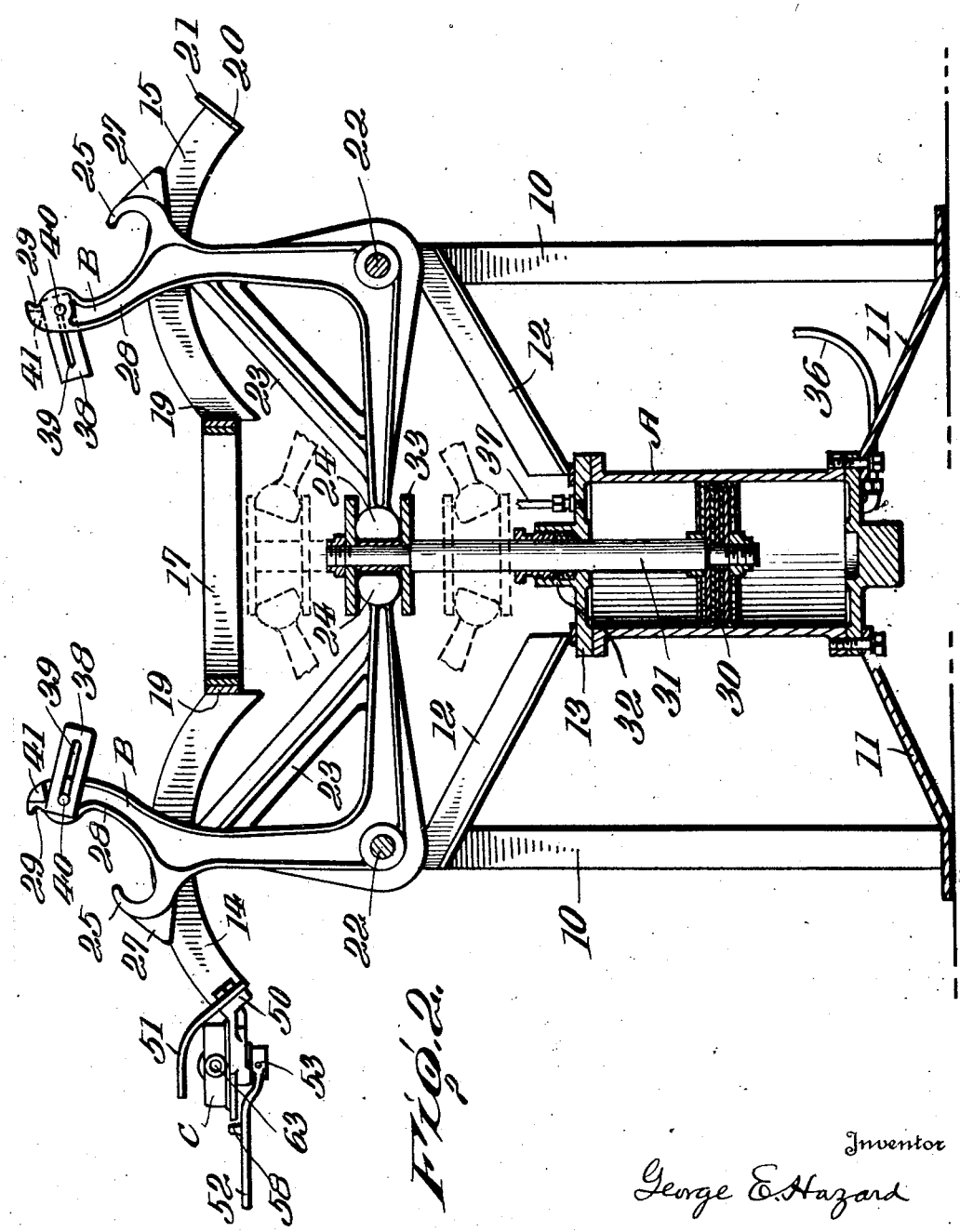

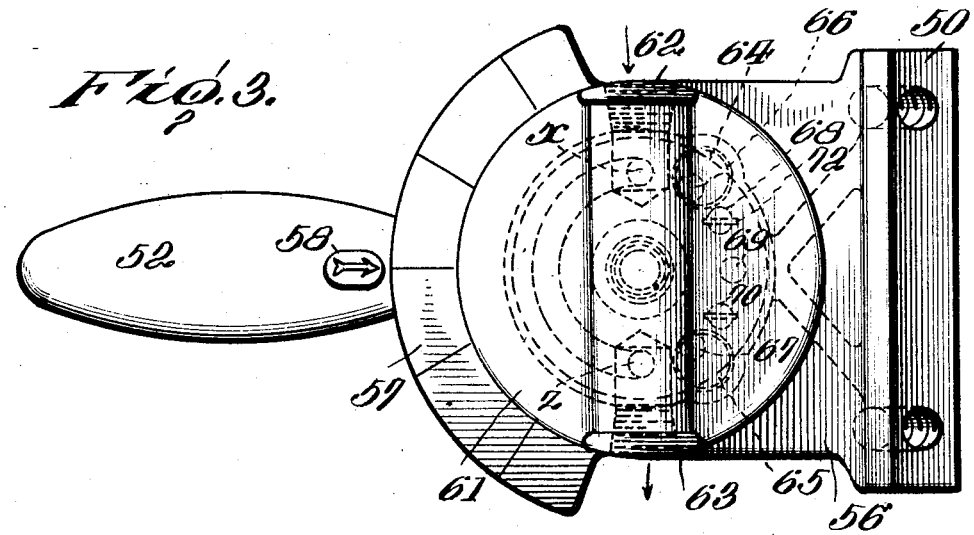
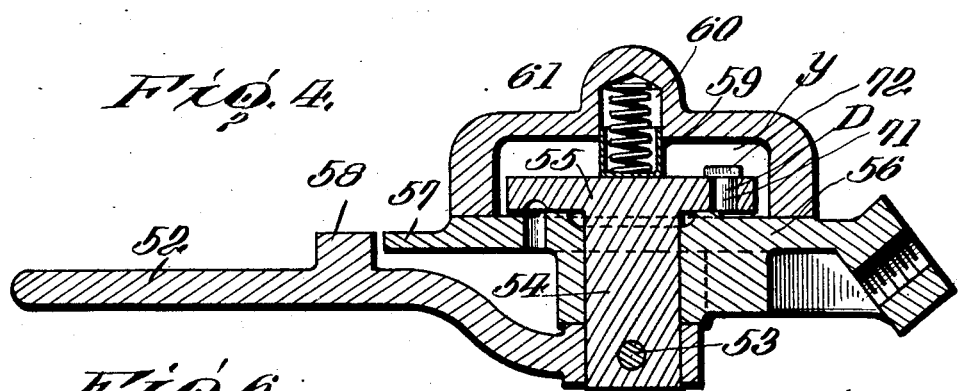
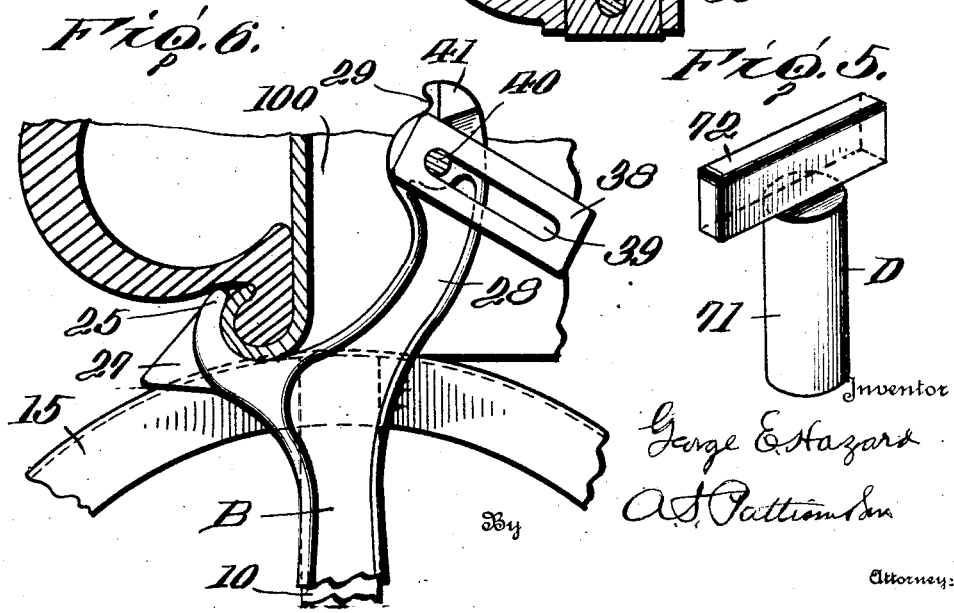

Patented July 30, 1929.

1,722,913

UNITED STATES PATENT OFFICE.

GEORGE EDGAR HAZARD, OF ROCHESTER, NEW YORK, ASSIGNOR TO KELLOGG MANUFACTURING COMPANY, OF ROCHESTER, NEW YORK.

TIRE-CHANGING MECHANISM.

Application filed November 3, 1927. Serial No. 230,912.

The present invention is designed for the purpose of expanding and contracting split vehicle rims for the purpose of facilitating the easy removal of the tire from the rim and is additionally designed for the purpose of supporting and holding solid rims or wire wheels while they are operated upon to remove the tires therefrom.

One of the objects of the invention is the provision of a device of the character described which is strong and durable and is therefore adapted to be set up in garages, service stations and the like, where such a mechanism is apt to be given hard usage and abuse.

Another and further object of the invention is the provision of a device of the character described which is capable of taking care of and operating upon rims of varying sizes.

A still further object of the invention is the provision of a device of the character described in which the members causing the expanding or contracting of the rim are operated by air or liquid pressure.

Another and further object of the invention is a device of the character described which is operated by liquid or air pressure and is so constructed that there are two speeds of operation of the expanding and contracting arms.

A still further object of the invention is the provision of a device of the character described which is operated by air or liquid pressure in which a novel construction of valve is used for controlling the pressure operating medium.

A further object of the invention is the provision of a device of the character described which is cheap and simple of construction and manufacture and which is highly efficient in use.

Further novel features of construction and improved results of the device will appear from the following description and the accompanying drawings.

In the drawings:

Figure 1 is a top plan view of the machine.

Figure 2 is a view in side elevation of the machine, certain parts including the cylinder and operating piston being shown in vertical section.

Figure 3 is a top plan view of the control valve.

Figure 4 is a vertical sectional view of the control valve.

Figure 5 is an enlarged perspective view of one of the regulating pins used in the valve.

Figure 6 is an enlarged view of the upper end of one of the rim supporting arms showing a vehicle rim in place and about to be contracted.

Figure 7 is an enlarged view of the upper end of one of the rim supporting arms showing the way in which it supports a solid rim or wire wheel.

Referring now to the drawings, it will be seen that the machine comprises a stand which has three vertical legs 10 and that a cylinder A is supported centrally within the stand upon suitably inwardly and upwardly extending brace or base members 11 while inwardly and downwardly extending brace members 12 extend from the vertical legs to the upper end or head 13 of the cylinder to brace and hold it firmly in place.

Suitably fastened intermediate their length upon the upper ends of the vertical legs 10 are three arc-shaped radiating segments 14, 15 and 16. The inner ends of these segments are stressed and joined together by an angular shaped brace or top member 17. These segments are in the form of two parallel pieces in separated relation to provide between them slots or guideways 18, the inner ends of the slots being closed by an inner end piece 19 while the outer ends of the slots are closed by an outer end piece 20, the upper end of which extends above the segments and offers a stop or abutment 21.

The rim supporting arms through the medium of which the tire rims are expanded and contracted are designated generally at B and are in reality more or less bell crank levers. That is to say these members are L-shaped and are pivoted intermediate their length at 22 upon the vertical arms 10 of the standard. As these arms must be strong to withstand the abuse to which they will be subjected, they are provided with braces 23.

The inner ends of the rim supporting arms are enlarged and rounded as at 24 while the upper ends of the arms extend through the walls or guides in the radiating segments and terminate in their upper end in a fork which is of a particular shape to accommodate, support and engage a tire rim. The outer arm of the fork is hook-shaped as appears at 25 and the outer face of this hook carries a wedge-shaped portion 27. The other arm 28 of the fork is curved and much longer, terminating at a point well above the hook-shaped portion and having in its inner face adjacent its upper end a groove or channel 29.

The specific reason for the particular configuration of the upper ends of the rim supporting arms will be pointed out and described when the description of the operation of the machine is given.

Referring to the cylinder A, it will be seen that a piston 30 is mounted for reciprocation therein and that the piston is provided, as is usual, with a piston rod 31. This piston rod is elongated and extends upwardly through a suitable packing or stuffing box 32 in the cylinder head carrying upon its upper end a suitable flanged collar 33 which is engaged by the inner enlarged and rounded ends 24 of the rim supporting arms.

The air for actuating the piston and consequently the rim supporting arms is led in from a suitable source of supply by a pipe or conduit 34 which enters one side of the valve C. At the opposite side of the valve there is provided an air line 35 which may be used for the purpose of inflating tires. In addition there extends from the valve an air line 36 which is in communication with the lower end of the cylinder A and a pipe line 37 which communicates with the upper end of the cylinder.

The particular manner in which the valve connects to the various conduits will be hereafter described, under the heading of "Valve construction".

Under the heading of "Operation and description" will be given the operation and function of the links 38 carried by the forked portion 28 of the rim supporting arms. These links are provided with slots 39 which engage and slide upon suitable studs 40 while the upper edges of the links engage the offsets 41 at the uppermost end of the arms. These offset portions 41 prevent the links from falling to a position below that shown in Figure 7 of the drawings and by reason of the slots 39 these links can be pushed inwardly to a position where they are out of the way when so desired.

*Control valve.*

The valve C is supported as at 50 to the arc-shaped segment 14 and is protected from damage by a suitable shield 51. The valve operating handle appears at 52 and is attached at 53 to the downwardly extending end or stub shaft 54 of the rotating disk valve 55. The plate or bottom 56 of the valve structure extends downwardly towards the valve handle and terminates in an arc-shaped scale 57 having suitable markings thereon so that when the pointer or arrow 58 of the valve handle is positioned opposite the several designations on the scale, the operator can tell the direction of flow of the liquid pressure.

The disk valve 55 is held downwardly against the bottom 56 through the medium of a spring plunger 59, the upper end of which is guided in a tubular depression or chamber 60 provided in the valve housing top 61.

The source of liquid pressure supply is attached to the end 62 of the housing while the hose used for tire inflation attaches at the opposite end 63 of the housing. When air is required or desired for inflating a tire, the air entering the inlet end 62 passes downwardly through the port or opening X into the valve chamber Y and thence through the opening or port Z to the air line or hose 35 connected with the tire.

The rotary disk valve which is operated by the handle 52 is mounted in the valve chamber Y. The tapped holes or outlets 64 and 65 on the under side of the valve disk 55 are the leads to the hose 37 and 36 to the top and bottom respectively of the operating cylinder A of the machine. The ports or openings 66 and 67 are connected with the ports 64 and 65 respectively. The valve disk 55 is provided with three small ports designated by the numerals 68, 69 and 70.

The movement of the operating handle 52 towards the left, causes the port 68 in the disk valve to register with the port 66 which port delivers air to the upper end of the cylinder. The port 68 carries a regulating pin D which is T-shaped, having a tubular portion 71 which is surmounted by a rectangular head or cross bar 72. The tubular portion of this regulating pin fits the port opening 68 within about one-thousandth of an inch and the T head rests upon the upper face of the disk valve as clearly appears in Fig. 4 of the drawings. As the rectangular shaped head is of less cross sectional width than the diameter of the tubular portion 71, the air passing upwardly by the tubular portion escapes past the head and into the conduit leading to the piston. This regulating pin construction is used in order to restrict the flow of air to the cylinder so that the plunger which operates the rim supporting arms will travel slowly. The amount of air which it is desired to deliver to the cylinder at slow speed operation would require that the hole 68 be so small that it would not be practical to drill it. By using a regulating pin it is possible to change the air flow at any time by changing the clearance between the pin and the hole and thereby avoid the necessity of having to work with such a delicate precision as would be necessary for drilling the hole small enough to permit the passage of a sufficiently small amount of air to cause a slow operation of the machine.

By moving the operating handle further to the left the port 69 comes in alinement and communication with the port 66. The port 69 carries no regulating pin and is used when a full speed operation of the machine is desired.

It will be obvious that the movement of the operating handle to the right would cause the openings 70 and 69 to come into communication with the port 65 for causing and controlling the air delivery to the lower end of the cylinder.

Operation.

In using the present apparatus for removing a tire from a split vehicle rim such as is illustrated at 100 in Figure 6 of the drawings, the arms B are thrown into their most contracted positions and the rim and tire dropped upon the segments 14, 15 and 16 which in reality form a top for the standard.

The valve handle 52 is then moved to a position to deliver air to the lower side of the piston 30 which forces the arms B outwardly. The wedge shaped portions 27 of these arms engage the rim and causes it to rise upwardly and drop into the space between the hooks 25 and the arms 28, thus automatically centering the rim upon the machine. This outward operation is made with the valve in a position to deliver a maximum amount of air to the cylinders so that the outward movement is at full speed.

The valve is then shifted to deliver air to the upper side of the piston, thus causing the rim supporting arms B to move inwardly. This operation is at "slow speed" and the rim is in the position shown in Figure 6 of the drawing, the links 38 being in their rear position. As the rim supporting arms move inwardly, the hook portions 25 engage the inner face of the lower flange of the rim and cause it to be contracted, thus enabling the tire to be lifted from the rim.

When it is desired to make the tire on the rim, the tire is replaced on the machine and the air directed to the lower side of the piston 30, thus forcing the arms B outwardly. The elongated portions 28 of the arms engage the rear face of the rim and cause the rim to be expanded and hold the rim in its extended position until the lock at the split portion of the rim is closed.

From the foregoing description the operation upon a split rim will be understood by anyone familiar with this art.

In Figure 7 the manner of operating upon a solid rim or upon a wire wheel is illustrated. When operating upon a solid rim or wire wheel the links 38 are moved outwardly into the position illustrated in Figure 7.

With the links in their extended position, the first operation is to move the supporting arms B into a diameter approximately that of the rim or wheel and then to drop the rim or wheel over the arms onto these links, which will readily support the rim. Air is then delivered to the cylinder to force the supporting arms outwardly until the wheel or rim slides inwardly upon the supporting links to a position where the grooves 29 in the elongated arms 28 engage the bead on the rear face of the rim or wheel. From this it will be seen that the links act as a support and guide until the supporting arms B are moved outwardly to firmly grip the rim.

When the rim or wheel is firmly gripped, the links 38 can be moved back to a position out of the way and the tire can be readily forced down and off of the rim or wheel.

From this it will be seen that when operating upon a solid rim or wire wheel, the apparatus acts as a support and clamp for holding the wheel or rim rigidly during the operation of removing and replacing the tire.

Having thus described my invention what I claim and desire to secure by Letters Patent is:

1. A tire changer of the character described, comprising a standard surmounted by a plurality of segments forming a top adapted to receive a vehicle rim, a plurality of rim supporting arms pivotally mounted on said standard and adapted to travel longitudinally of said segments, means to simultaneously rock said arms on their supports, said arms having means adapted to engage and overlie the lower flange of a vehicle wheel rim during the inward travel of said arms, and means on said arms for engaging during the outward travel of said arms a rim supported upon said segments and cause said rim to be lifted and moved into engagement with said means which overlies the lower flange of the rim.

2. A tire changer of the character described, comprising a standard, rim supporting arms pivotally mounted upon said standard, the upper ends of said arms provided with links for supporting a wheel or rim, grooves in said arms above said links, and means to rock said arms and move them simultaneously outward, to lift said wheel or rim from said links and bring it into engagement with grooves in said arms, for the purpose described.

3. A tire changer adapted to operate upon either split or solid vehicle rims of the character described, comprising a standard having a plurality of rim supporting and engaging arms pivotally mounted thereon, means to rock said arms to simultaneously contract or expand them, the upper ends of said arms forked into a long and short arm, said short arm of a hook-shape to engage the lower flange of a transversely split vehicle wheel rim during the inward travel of the said arms, the long arms provided with links for supporting a solid wheel or rim, and grooves in said long arms above said links for engaging and clamping a solid wheel or rim upon the outward movement of said arms.

4. A tire changer of the character described, comprising a standard composed of a plurality of legs, a stop for said standard, rim supporting arms pivotally mounted upon said standard legs and having their upper ends extending through and above said top, the ends of the arms above the segments provided with means to engage a vehicle wheel rim, the lower ends of said arms extending inwardly into the space between the legs forming the standard, a cylinder and a piston therein, said piston having an elongated rod attached to the inwardly extending lower ends of said arms, and means to actuate said piston to rock the arms upon their pivotal support, for the purpose described.

5. A tire changer comprising a standard composed of a plurality of legs in separated relation, segments attached to the upper ends of said legs and forming a top for said standard, rim supporting and engaging arms pivotally mounted intermediate their lengths upon said standard legs, the upper ends of said arms extending through and above said segments and provided with means for engaging and overlying the lower flange of a vehicle wheel rim, the lower ends of said arms extending inwardly from their pivotal support into the space between the standard legs, a cylinder having a piston therein positioned in the space between the standard legs, said piston having an elongated rod operatively connected to the inwardly extending lower legs of the arms, and means to actuate said piston to rock the arms upon their pivotal supports, for the purpose described.

6. A tire changer of the character described, comprising a standard having a top for receiving and supporting a vehicle rim, a plurality of rim receiving and supporting arms pivotally mounted on said standard and extending upwardly through the top and adapted to travel longitudinally of said top, means to simultaneously rock said arms on their supports, said arms having means adapted to engage and overlie the lower flanges of a vehicle rim during the inward travel of said arms, and means on said arms for engaging during the outward travel of said arms a rim supported upon said standard top and cause said rim to be lifted and moved into engagement with said means which overlies the lower flange of the rim.

In testimony whereof I hereunto affix my signature.

GEORGE EDGAR HAZARD.